(12) United States Patent
Girardier et al.

(10) Patent No.: US 10,158,985 B2
(45) Date of Patent: Dec. 18, 2018

(54) CONTROLLING CONNECTED MULTIMEDIA DEVICES

(71) Applicant: TAP SOUND SYSTEM, Fontenay-sous-Bois (FR)

(72) Inventors: Thomas Girardier, Fontenay-sous-Bois (FR); Julien Goupy, Fontenay-sous-Bois (FR); Bertrand Fatus, Fontenay-sous-Bois (FR)

(73) Assignee: TAP SOUND SYSTEM, Fontenay-sous-Bois (FR)

( * ) Notice: Subject to any disclaimer, the term of this patent is extended or adjusted under 35 U.S.C. 154(b) by 0 days.

(21) Appl. No.: 15/655,551

(22) Filed: Jul. 20, 2017

(65) Prior Publication Data

US 2018/0027368 A1     Jan. 25, 2018

(30) Foreign Application Priority Data

Jul. 22, 2016    (FR) ..................... 16 57074

(51) Int. Cl.
*H04B 7/00*      (2006.01)
*H04W 4/80*      (2018.01)
(Continued)

(52) U.S. Cl.
CPC .......... *H04W 4/80* (2018.02); *H04B 10/1141* (2013.01); *H04L 12/189* (2013.01);
(Continued)

(58) Field of Classification Search
CPC ............................ H04W 4/008; H04W 56/004
See application file for complete search history.

(56) References Cited

U.S. PATENT DOCUMENTS

2009/0175214 A1    7/2009   Sfar et al.
2011/0129048 A1    6/2011   Barbe et al.
(Continued)

FOREIGN PATENT DOCUMENTS

FR     2920930 A1     3/2009

OTHER PUBLICATIONS

Search report, dated May 19, 2017, in corresponding French Application No. 1657074.
(Continued)

*Primary Examiner* — Xin Jia
(74) *Attorney, Agent, or Firm* — Young & Thompson

(57) ABSTRACT

Disclosed is a device for controlling wireless multimedia devices, including: a wireless communication circuit, to receive a wireless multimedia device identifier from each wireless multimedia device; an access circuit for accessing a database of wireless multimedia devices, to obtain from the database characteristics of each wireless multimedia device for which the communication circuit has received an identifier; a separation circuit for separating a main multimedia stream into as many separated multimedia streams as the communication circuit has received identifiers of wireless multimedia devices; an allocation circuit for allocating each separated multimedia stream to a respective wireless multimedia device; and a synchronization circuit for synchronizing the separated multimedia streams based on the characteristics of the wireless multimedia devices obtained from the database.

9 Claims, 6 Drawing Sheets

(51) Int. Cl.
  *H04W 56/00*    (2009.01)
  *H04B 10/114*   (2013.01)
  *H04L 12/18*    (2006.01)
  *H04M 1/725*    (2006.01)
  *H04N 21/4363*  (2011.01)
  *H04S 7/00*     (2006.01)
  *H04N 21/43*    (2011.01)

(52) U.S. Cl.
  CPC ...... *H04M 1/7253* (2013.01); *H04N 21/4307* (2013.01); *H04N 21/43637* (2013.01); *H04S 7/308* (2013.01); *H04W 56/004* (2013.01); *H04R 2420/07* (2013.01)

(56) References Cited

U.S. PATENT DOCUMENTS

| | | | |
|---|---|---|---|
| 2013/0311298 A1* | 11/2013 | Ayoub | G06Q 30/0277 705/14.66 |
| 2013/0340014 A1* | 12/2013 | Evans | H04N 21/6156 725/74 |
| 2014/0029701 A1 | 1/2014 | Newham et al. | |
| 2014/0244863 A1* | 8/2014 | Bradley | H04L 29/06027 709/248 |
| 2015/0382050 A1* | 12/2015 | Le Nerriec | H04L 45/16 725/80 |
| 2016/0080506 A1 | 3/2016 | Wang et al. | |

OTHER PUBLICATIONS

He, J., Huang, Z. Q., Hou, Y. B., & Dong, Y. M. (Apr. 2010). Point-to-Multipoint Stereo Audio Transmitting System Based on Bluetooth. In Communications and Mobile Computing (CMC), 2010 International Conference on (vol. 3, pp. 323-328). IEEE. XP031680609.

SIG: "Bluetooth Specification version 4.2 [vol. 3, Part A] Retransmission and flow control option", (vol. 3, pp. 96-101). XP055357396. (Dec. 2014).

* cited by examiner

CONTROLLING CONNECTED MULTIMEDIA DEVICES

BACKGROUND OF THE INVENTION

Field of the Invention

The description relates in particular to a device for controlling connected multimedia devices, in particular connected loudspeakers, also called wireless speakers.

It is increasingly common to connect a source device (computer, tablet, mobile phone, etc.) containing multimedia content to a wireless speaker suitable for reproducing the sound of the multimedia content. It seems desirable to be able to connect a source device to multiple wireless speakers in order to obtain better sound (for example stereophonic sound, or even 5.1 surround sound or other configurations). It is then desirable to synchronize these speakers so that there is no delay between the sound played on two different speakers. A similar problem arises in the case of multimedia content other than audio, for example in the case of video projection. This may involve the transmission of several copies of the same stream, for example live transmission of a video of a conference on several screens located in the same room. It may also involve the transmission on multiple screens of videos corresponding to the same scene from different points of view (for example in a video game context), the videos then being different but needing to be perfectly synchronized.

When all the connected loudspeakers used are from the same manufacturer and are known to the source device, the manufacturer can control the entire chain and can set up the synchronization software. Each speaker can for example communicate data such as a pointer indicating the next part of a buffer memory to be read or the state of a clock internal to the source device, which can be arranged to draw the necessary conclusions by determining the relative values of the various internal clocks and the different read positions in the respective buffer memories of the various speakers. However, when a source device connects to wireless speakers that it does not know and especially when these speakers are heterogeneous (for example from different manufacturers), it is impossible to synchronize these speakers as their operation and characteristics are unknown.

Description of the Related Art

A commonly used wireless protocol is the Bluetooth protocol. Bluetooth is a communication standard that is well known to the person skilled in the art, defined since 1994 and managed by a group of manufacturers (the Bluetooth SIG) which publishes the successive versions. The current version is version 4.2 and a version 5 has just been announced. Bluetooth allows two-way communication of data over short distances (known as a piconet which refers to a network covering a personal area). The range of Bluetooth devices is thus limited to a few tens of meters. Bluetooth uses radio waves that are in the UHF band (between 300 MHz and 3 GHz). Bluetooth aims to simplify connections between electronic devices by eliminating wired links. Bluetooth thus allows replacing, with wireless communications, the cords between a master multimedia device (hi-fi system, radio, computer, tablet, mobile phone, etc.) and target multimedia devices such as speakers arranged to reproduce a multimedia stream received.

Bluetooth speakers have met with some success because of their high portability.

However, if an audio data exchange profile called the A2DP profile is used, the Bluetooth standard does not allow a Bluetooth chip to transmit multiple audio streams in parallel to multiple multimedia devices that one wishes to synchronize. This A2DP profile does not allow synchronized point-to-multipoint transmission. The Bluetooth standard in fact states that: "The following restrictions are applied to this profile: 1. This profile does not support a synchronized point-to-multipoint distribution." Thus, in theory it is not possible to design a device for synchronized control of Bluetooth multimedia devices with the synchronized control device comprising a single Bluetooth chip for controlling multiple multimedia devices, because Bluetooth does not allow it.

It has already been proposed to create a point-to-multipoint Bluetooth device for multiple speakers. For example, application FR2920930 filed on Sep. 6, 2007 and now permanently abandoned, proposed such a device. But this application did not describe how to implement such a device, which seems impossible under the Bluetooth standard if only one Bluetooth chip is used. The inadequate description of this application prevents drawing any relevant teachings as to how to create a point-to-multipoint link, and even more so a synchronized point-to-multipoint link.

Although Bluetooth does not provide for it, it would be possible to create in a Bluetooth chip a device to control several Source SEPs in order to control multiple Bluetooth devices (instead of providing as many Bluetooth chips in a control circuit as there are Bluetooth devices to be controlled). An SEP is a "Stream End Point". Bluetooth communications are point-to-point between two SEPs. An SEP represents the resources and capabilities of a device. For example, a device such as a mobile phone may have three SEPs, one representing its capabilities as a video receiver, another representing its capabilities as an audio receiver with an SBC codec, and a last one representing its capabilities as an audio receiver with an aptX codec. Each codec must be associated with a different SEP than the one(s) associated with other codec(s), but the same codec can be associated with multiple SEPs.

However, if the Bluetooth devices are Bluetooth multimedia devices, the problem arises of synchronizing the signals transmitted to each of these Bluetooth multimedia devices in A2DP.

The acronym A2DP stands for "Advanced Audio Distribution Profile." The conventional A2DP profile defines a set of protocols and procedures for the exchange of audio data via the Bluetooth protocol between a master device (known as the Source) and a slave device (known as the "Sink", designating the ultimate destination of a stream, for example a Bluetooth speaker). This A2DP profile is constructed using several layers defined by the Bluetooth standard.

The profile relies in particular on low-level layers that are well known to those skilled in the art. These layers comprise:
 a "Baseband" layer, the Baseband layer being identified by the reference BB in FIG. 1,
 an "LMP" layer (acronym for "Link Manager Protocol");
 an "L2CAP" layer (acronym for "Logical Link Control and Adaptation Protocol"),
 an SDP layer ("Service Discovery Protocol").

These layers are protocols defined in the Bluetooth standard.

The A2DP profile also relies on a high-level layer called the application layer (denoted AASo and AASi in FIG. 1, respectively for "Application Audio Source" and "Application Audio Sink"). This is the layer in which the device determines the transport parameters and the various services available. It is also at this level that the choice of codec used to transmit the audio data is made (which may involve decoding followed by re-encoding when the audio stream to be transmitted is already encoded, which is usually the case).

Lastly, the A2DP profile relies on an AVDTP layer ("Audio/Video Distribution Transport Protocol") that defines the binary transactions between Bluetooth devices for setting up a stream and for streaming an audio and/or video stream using L2CAP. It therefore covers procedures for establishing the audio stream, negotiating the parameters of the audio stream, and transmitting the data of the audio stream. AVDTP comprises a signaling entity for negotiating streaming parameters and a transport entity for managing the stream itself. AVDTP defines a transport protocol for audio and/or video data. More specifically, AVDTP concerns the transport of audio and/or video data between two SEPs.

A limitation imposed by AVDTP according to the Bluetooth standard is that when a connection has been negotiated between two SEPs, these two SEPs must be locked to each other for streaming. By default, a connected SEP refuses any new connections. In recent Bluetooth products, a function known as "social mode" sometimes allows changing this default behavior. However, although this social mode function allows a new connection, it cuts off the current connection. For example, there can be two telephones connected to the same Bluetooth speaker, but multiple simultaneous transports cannot be set up. Switching to a new connection typically occurs by terminating the previous connection while keeping the previously connected telephone in memory. As a result, if there is only one audio source SEP on a Source device then only one AVDTP transport can be established to a given Sink device at a given time, according to the Bluetooth standard.

The L2CAP layer defines the most basic data exchange protocol of the Bluetooth specification. The L2CAP layer enables the segmentation and reassembly of packets, multiplexing, and quality of service. It is from this L2CAP layer that the various transport protocols (such as AVDTP) based on different Bluetooth profiles (such as A2DP) are implemented. An L2CAP channel is created between a CID ("Channel Identifier") of a master device and a CID of a slave device, allowing the exchange of data between these two devices. The L2CAP channels are each configured to manage the control of data streams passing through channels defined by L2CAP (L2CAP channels). For this purpose, different parameters can be taken into account independently for each L2CAP channel, in particular:

An FTO or "Flush Timeout" parameter defines an expiration period for a data packet in a buffer memory of a master device. This period is infinite by default (blocked mode), which means that a transmitted packet that does not reach its destination is resent until a packet (the initial packet or the resent packets) has reached the destination. However, the period can also be such that retransmission never occurs (if the "Flush Timeout" parameter is set to an appropriate value defined by the Bluetooth standard), which amounts to a zero period. The period can also have a finite value. There exists a Boolean variable called "flag non-automatically flushable" in Bluetooth packets, which allows indicating that the packet concerned cannot be deleted automatically.

A QoS parameter (acronym for "Quality of Service") which enables defining the maximum latency between inclusion of a packet to be transmitted in an L2CAP channel and its actual transmission.

Parameters called "Extended Flow Features", replacing and supplementing the combination of the "Flush Timeout" and "QoS" parameters mentioned above.

These parameters are negotiated between the Bluetooth stack of a master Bluetooth device and the Bluetooth stack of a slave Bluetooth device, and apart from the default values are not always supported.

L2CAP enables the implementation of different modes. These modes are also parameters of the L2CAP channels, in the same manner as the "Extended Flow features" parameters or the "Flush Timeout" parameter. It is the set of all these parameters (including modes) that enables modifying the control of streams. Each mode defines different procedures for managing data streams. Within the conventional Bluetooth framework (called BR/EDR), five operating modes are possible for an L2CAP channel. These modes are:
  "Basic Mode" (basic L2CAP mode),
  "Flow Control Mode",
  "Retransmission Mode",
  "Enhanced Retransmission Mode" (known as "ERTM"), and
  "Streaming Mode" (known as "SM").

"Basic Mode" is the default mode and is supported by all Bluetooth stacks. It does not require any configuration. "Flow Control Mode" sends packets but never retransmits lost packets. However, these packets (called PDUs) are detected when they are lost, and "Flow Control Mode" allows the communication of a report listing the lost packets. "Flow Control Mode" and "Retransmission Mode" can only be used if "ERTM" and "SM" are not usable. These two modes ("Flow Control Mode" and "Retransmission Mode") are now almost never used. "ERTM" makes it possible to take into account a given maximum number of retransmissions and a given maximum duration during which a retransmission can take place, and makes it possible to identify the packets that are lost or corrupted. "SM" is adapted for asynchronous data flows. It takes into account a finite "Flush Timeout" parameter. On the Bluetooth receiver side, if the buffer memory is full the previous data are overwritten.

In the Bluetooth standard, a parameter called "Retransmission and flow control option" allows choosing a mode. The Bluetooth standard recommends establishing "reliable" connections that limit data loss, using a "Basic Mode" with an infinite "Flush Timeout", or in more recent Bluetooth stacks "ERTM" with any "Flush Timeout".

In practice, no product on the market offers a synchronized point-to-multipoint A2DP control function for any Bluetooth multimedia devices.

BRIEF SUMMARY OF THE INVENTION

The invention aims to improve the situation.

The invention relates in particular to a device for controlling wireless multimedia devices, comprising:
  a wireless communication circuit, arranged to receive a wireless multimedia device identifier from each wireless multimedia device;
  an access circuit for accessing a database of wireless multimedia devices, arranged to obtain from said database characteristics of each wireless multimedia device for which the wireless communication circuit has received an identifier;
  a separation circuit for separating a main multimedia stream into as many separated multimedia streams as the wireless communication circuit has received identifiers of wireless multimedia devices;
  an allocation circuit for allocating each separated multimedia stream to a respective wireless multimedia device;

a synchronization circuit for synchronizing the separated multimedia streams based on the characteristics of the wireless multimedia devices obtained from the database.

Such a device is advantageous in that it is capable, by virtue of a reference database, of extracting pertinent information concerning the wireless multimedia devices to which it is connected and of synchronizing said wireless multimedia devices based on this information.

The device according to the invention may comprise one or more of the following characteristics, taken alone or in combination.

The invention relates in particular to a device for controlling wireless multimedia devices wherein the characteristics of each wireless multimedia device include a latency of said wireless multimedia device, the synchronization circuit being arranged to temporally shift the transmission of a separated multimedia stream intended for a wireless multimedia device, based on its latency.

The invention relates in particular to a device for controlling wireless multimedia devices which is arranged, when a multimedia stream packet intended for a wireless multimedia device is lost, to resend said multimedia stream packet to said wireless multimedia device, wherein, as each wireless multimedia device comprises a buffer memory, the synchronization circuit is arranged to determine a fill level of the buffer memory of at least one wireless multimedia device, and to determine a maximum duration during which the device for controlling wireless multimedia devices can resend a lost multimedia stream packet to a wireless multimedia device based on the fill level of the buffer memory of the at least one wireless multimedia device.

The invention relates in particular to a device for controlling wireless multimedia devices comprising a harmonization circuit for harmonizing the separated multimedia streams based on characteristics of the wireless multimedia devices for which the wireless communication circuit has received an identifier, the characteristics of each wireless multimedia device including a frequency response of said wireless multimedia device for each frequency band in a set of frequency bands, the harmonization circuit being arranged to adjust the amplitude of each frequency component of a separated multimedia stream intended for a wireless multimedia device, based on the frequency response of said wireless multimedia device for said frequency component.

The invention relates in particular to a method for controlling wireless multimedia devices, comprising:

receiving, by a wireless communication circuit, a wireless multimedia device identifier from each wireless multimedia device;

obtaining, by an access circuit for accessing a database of wireless multimedia devices, characteristics of each wireless multimedia device for which an identifier has been received by the wireless communication circuit;

separating, by a stream separation circuit, a main multimedia stream into as many separated multimedia streams as the wireless communication circuit has received wireless multimedia device identifiers;

allocating, by an allocation circuit, each separated multimedia stream to a respective wireless multimedia device;

synchronizing, by a synchronization circuit, the separated multimedia streams based on the characteristics of the wireless multimedia devices obtained from the database.

The invention relates in particular to a method for controlling wireless multimedia devices, wherein the characteristics of each wireless multimedia device include a latency of said wireless multimedia device, and wherein the synchronization circuit temporally shifts the transmission of a separated multimedia stream intended for a wireless multimedia device, based on its latency.

The invention relates in particular to a method for controlling wireless multimedia devices wherein, when a multimedia stream packet intended for a wireless multimedia device is lost, the method resends said multimedia stream packet to said wireless multimedia device, and wherein, as each wireless multimedia device comprises a buffer memory, the synchronization circuit determines a fill level of the buffer memory of at least one wireless multimedia device, and determines a maximum duration during which the device for controlling wireless multimedia devices can resend a lost multimedia stream packet to a wireless multimedia device based on the fill level of the buffer memory of the at least one wireless multimedia device.

The invention relates in particular to a method for controlling wireless multimedia devices, wherein a harmonization circuit harmonizes separated multimedia streams based on characteristics of the wireless multimedia devices for which the wireless communication circuit has received an identifier, the characteristics of each wireless multimedia device including a frequency response of said wireless multimedia device for each frequency band in a set of frequency bands, the harmonization circuit adjusting the amplitude of each frequency component of a separated multimedia stream intended for a wireless multimedia device, based on the frequency response of said wireless multimedia device for said frequency component.

The invention relates in particular to a computer program comprising a series of instructions which, when executed by a processor, implement a method according to an embodiment of the invention.

The invention relates in particular to a computer-readable non-transitory storage medium storing a computer program according to an embodiment of the invention. dr

BRIEF DESCRIPTION OF THE DRAWINGS

Other features and advantages of the invention will be apparent from the following description. This description is purely illustrative and is to be read with reference to the appended drawings in which.

DETAILED DESCRIPTION OF THE PREFERRED EMBODIMENTS

Figure 1:
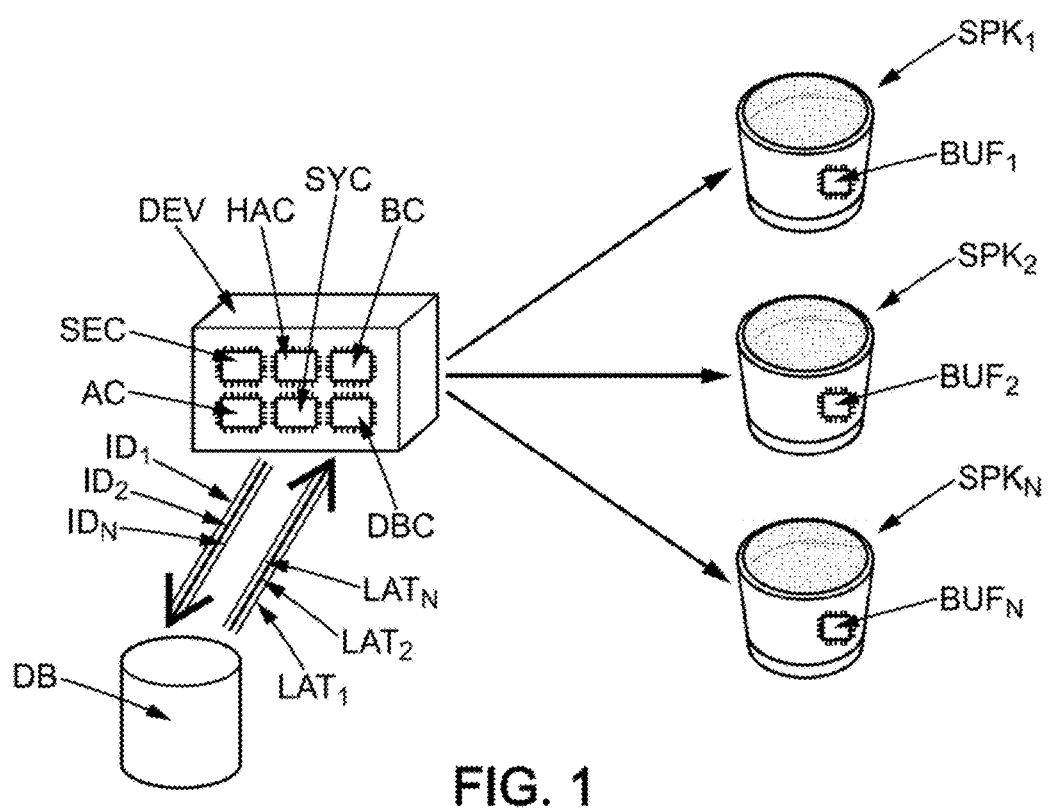
FIG. 1 illustrates a system comprising a device according to an embodiment of the invention as well as a set of Bluetooth speakers.

The following embodiments are examples. Although the description refers to one or more embodiments, this does not necessarily mean that each element mentioned in the context of one embodiment relates only to that embodiment, or that features of that embodiment apply only to that embodiment.

FIG. 1 illustrates a system comprising a device DEV for controlling wireless speakers according to an embodiment of the invention, as well as a set of wireless speakers $SPK_1$, $SPK_2$ and $SPK_N$ each comprising a respective buffer memory $BUF_1$, $BUF_2$ and $BUF_N$. The device DEV comprises a wireless communication circuit BC (such as a Bluetooth circuit) enabling communication with the wireless speakers $SPK_1$, $SPK_2$ and $SPK_N$ and in particular enabling identifying them. The device DEV comprises an access circuit DBC for accessing a database DB comprising information (such as latencies $LAT_1$, $LAT_2$ and $LAT_N$) about different types of wireless speakers, information associated with the identifiers $ID_1$, $ID_2$ and $ID_N$ of these different types of wireless speakers. The device DEV comprises a circuit SEC for separating a main audio stream into as many separated audio streams as the control device has received (via its wireless communication circuit) wireless speaker identifiers. The device DEV comprises an allocation circuit AC for allocating each separated audio stream to a respective wireless speaker. The device DEV comprises a synchronization circuit SYC for synchronizing the separated audio streams based on characteristics of the wireless speakers for which the wireless communication circuit has received an identifier. The device DEV comprises a harmonization circuit HAC for harmonizing the separated audio streams based on characteristics of the wireless speakers for which the wireless communication circuit has received an identifier.

Figure 2:
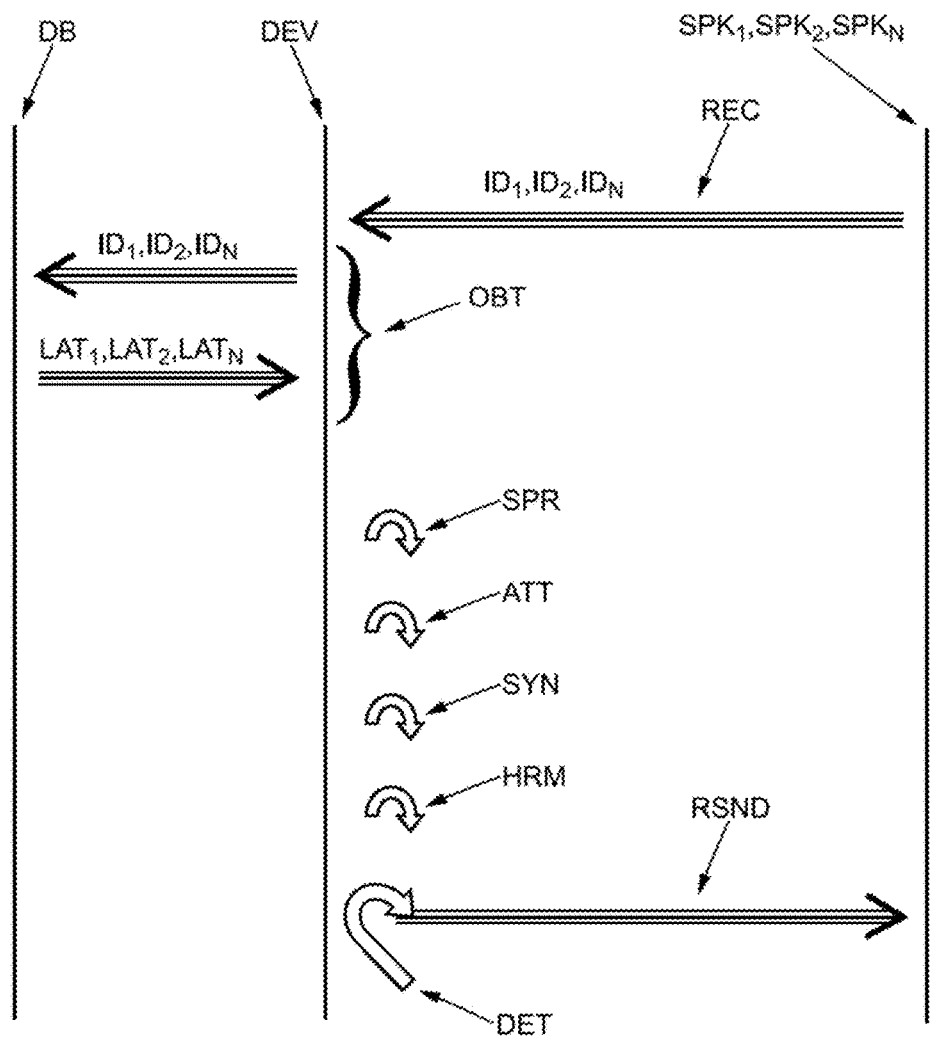
FIG. 2 illustrates a method according to an embodiment of the invention.

FIG. 2 illustrates a method according to one embodiment of the invention.

The method comprises the receiving REC, via a wireless communication circuit BC, of the identifiers $ID_1$, $ID_2$ and $ID_N$ of wireless speakers $SPK_1$, $SPK_2$ and $SPK_N$.

Based on these identifiers $ID_1$, $ID_2$ and $ID_N$, the method comprises a step OBT of obtaining parameters $LAT_1$, $LAT_2$ and $LAT_N$ associated with the various wireless speakers by sending the received identifiers to a database DB in order to obtain the requested parameters in return.

The method then comprises a step SPR of separating an audio stream into a number of audio sub-streams that is equal to the number of wireless speakers detected (for which the method has received the identifiers).

The method then comprises a step ATT of allocating each sub-stream to a respective wireless speaker.

The method then comprises a synchronization step SYN which ensures that the audio from the different sub-streams is played simultaneously by all the wireless speakers.

In the case in point, the method comprises additional steps.

In particular, it comprises a harmonization step HRM, during which it modifies the audio streams sent to the wireless speakers, based on the characteristics of the speakers, in order to enable as reliable a reproduction as possible.

It also comprises, in case of transmission error (loss of audio stream packet for example), a step RSND of resending lost or corrupted data followed by a step DET of determining a fill level of the buffer memory of each wireless speaker, in order to stop sending data if it appears to be pointless. If the conditions allow resending data, the data are resent. Otherwise, the method will abort the procedure for recovering lost data, as this would take too long and could result in loss of synchronization.

Figure 3:
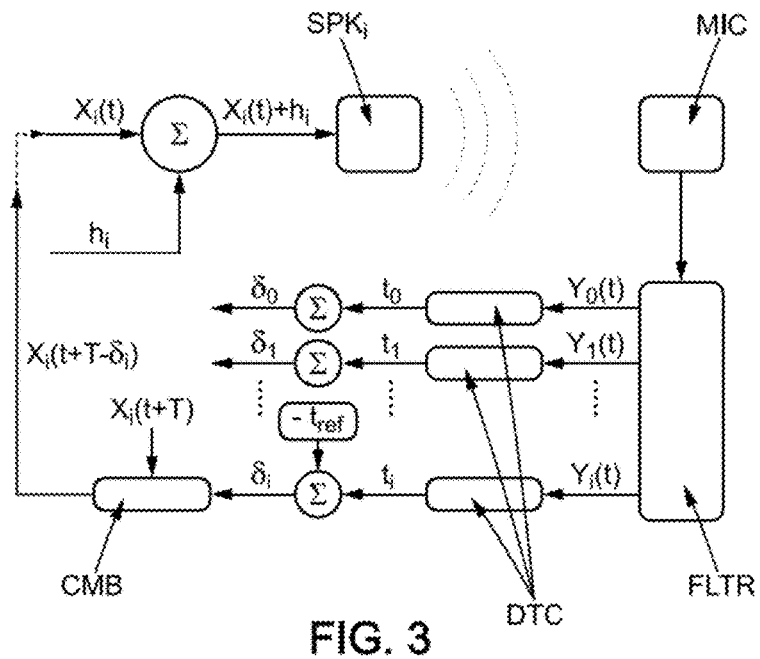
FIG. 3 illustrates a synchronization technique according to an embodiment of the invention.

FIG. 3 illustrates a synchronization technique according to an embodiment of the invention. In this technique, the device DEV is equipped with a microphone MIC enabling it to pick up ambient acoustic signals. The device DEV is also arranged to transmit to each wireless speaker a signal $h_i$ that lies outside the spectrum audible to humans but capable of being reproduced by the wireless speaker and picked up by the microphone MIC, this signal being chosen in a manner to identify the wireless speaker in question. Each wireless speaker $SPK_i$ receives a signal $h_i$ that is unique to it because assigned to that speaker alone, superimposed on the audio stream. The microphone can thus measure the signal emitted by all the wireless speakers and, based on the delay measured between the moment when the signal was integrated into the audio stream and the moment when this signal was detected, the method can estimate any desynchronization and compensate for it, even though it has no access to the internal functions of the wireless speaker in question.

More specifically, the device DEV is provided with a bank of filters FLTR. By means of these filters (which may be digital or analog), the device DEV can generate, from the input signal, a set of output signals whose respective spectra are included within respective frequency bands, and can then detect the delays of each wireless speaker by means of detection modules DTC via these signals. The result which arises from this detection (measured delay) can be combined CMB with the other input parameter of the CMB function (the signal to be transmitted). Thus, when the stream is transmitted (to speaker $SPK_i$ in FIG. 3) after a delay is detected, the signal sent to the speaker $SPK_i$ is already resynchronized based on the detected delay.

According to one possible implementation, the device DEV superimposes, on the audio signal that represents a stream emitted by each wireless speaker, a signal $h_i$ of frequency $f_i$ equal to $f_{ref}+i*df$, where $f_{ref}$ is a reference frequency and df is a frequency increment, $f_{ref}$ and df being constants; and i is the number of the wireless speaker $SPK_i$ concerned (receiving a supplemental signal $h_i$). This signal $h_i$ is for example the signal represented by the function $t \to \sin(2*\pi*f_i*t)$. According to one possible implementation, $f_{ref}$ lies above the audible acoustic spectrum and below the maximum frequency that can be generated by the entry-level speaker products on the market. The integer i is for example between 0 and the number of speakers minus 1. The frequency $f_{ref}$ is for example between 16 kHz and 20 kHz. As for the frequency increment df, it is for example between 100 Hz and 400 Hz. Thus, for example, five speakers are associated with respective supplemental signals at 18 kHz, 18.2 kHz, 18.4 kHz, 18.6 kHz, and 18.8 kHz.

Each supplemental signal $h_i$ is for example transmitted for 300 ms, then discontinued for 300 ms, then again transmitted for 300 ms, etc. This amounts to applying an amplitude modulation of the supplemental signal $h_i$ by a square wave signal alternating between a value of 0 for 300 ms and 1 for 300 ms. Indeed, if the supplemental signal $h_i$ were emitted continuously, it would be very difficult to detect a delay greater than the period of the signal $1/f_i$, which is very short (at most 1/18 kHz=56 μs in the above example of five speakers). In the example considered, it is possible to detect a delay having a maximum duration of 2*300 ms, which is 0.6 s.

In a more elaborate approach, each supplemental signal $h_i$ may be transmitted continuously but with low-frequency amplitude modulation by a strictly positive periodic function, and, to simplify calculations, piecewise. For example, each supplemental signal $h_i$ may be amplitude modulated by a triangle function with a frequency of 0.1 Hz, varying between 0.5 and 1. Thus, depending on the amplitude of the supplemental signal $h_i$ received, it is possible to determine the delay (in the example considered, the maximum delay detected is a delay of 1/0.1 Hz=10 s).

Figure 4:
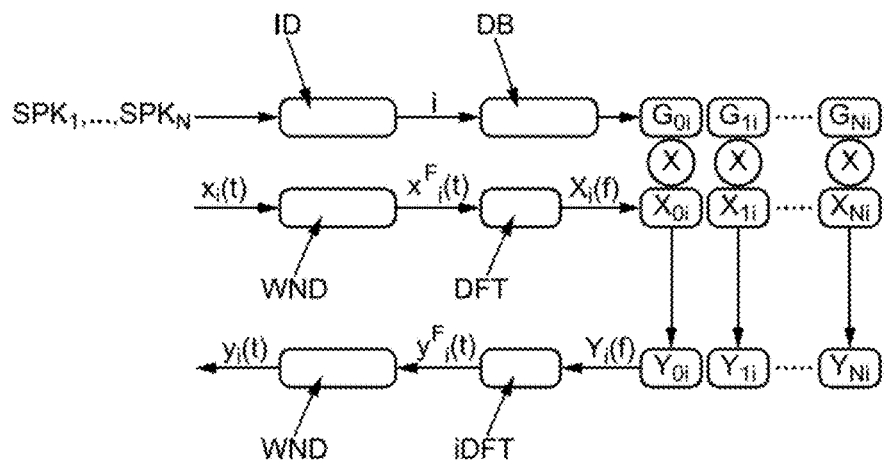
FIG. 4 illustrates a harmonization technique according to an embodiment of the invention.

FIG. 4 illustrates a harmonization technique according to one embodiment of the invention. In response to an identifier ID received from a wireless speaker, the method accesses the database DB and extracts the gain (attenuation or amplification depending on whether the gain is less than or greater than 1) to be applied (gains $G_{0,i}$ etc.). Instead of directly transmitting a signal Xi(t), the method begins by applying a windowing function WND to this signal. The method then applies a discrete Fourier transform DFT, in order to be able to apply the desired gains. For example, the method applies the respective gains $G_{0,i}$, $G_{1,i}$, . . . $G_{Ni}$ to the respective spectrum portions of the signal Xi(t). These spectrum portions are, for example, [$f_{min}$, $f_{min}$ +($f_{max}$-$f_{min}$)/N[, [$f_{min}$+ ($f_{max}$-$f_{min}$)/N, $f_{min}$+2*($f_{max}$-$f_{min}$)/N[ . . . [$f_{min}$+(N-1)*($f_{max}$-$f_{min}$)/N, $f_{max}$], where $f_{min}$ and $f_{max}$ represent the minimum and maximum frequencies of the spectrum used for signal Xi(t). Then, once the gain is applied, the method returns to the time domain by performing an inverse Fourier transform iDFT. Of course, the applied gains may be greater than 1 and may be less than 1. This may therefore involve an amplification in the strict sense (gains greater than 1) or an attenuation in the strict sense (gain less than 1).

Figure 5:
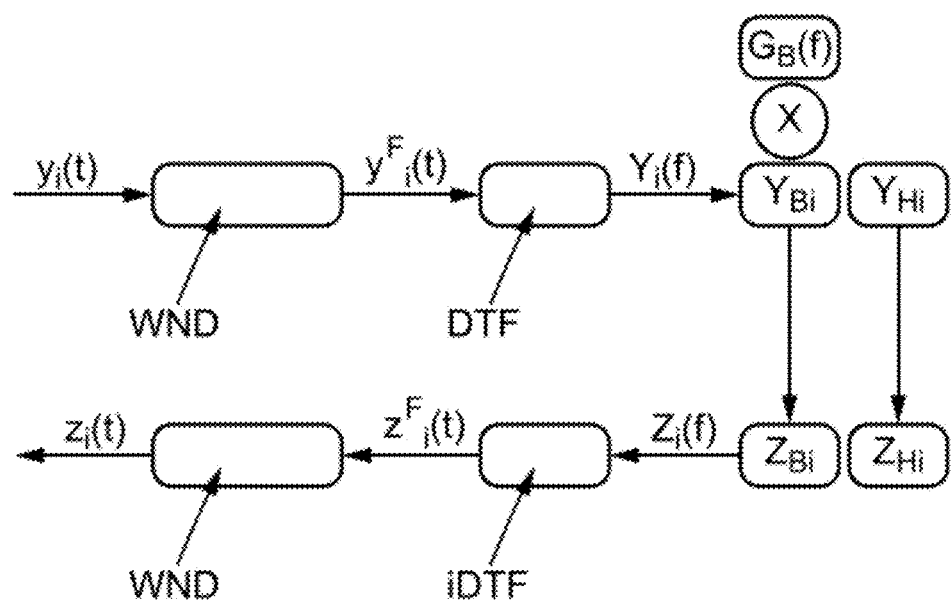
FIG. 5 illustrates a technique for adjusting the amplitude of the low frequencies according to an embodiment of the invention.

FIG. 5 illustrates a technique for adjusting the amplitude of the low frequencies according to one embodiment of the invention. The technique is comparable to that of FIG. 4, but does not include the detection step. After windowing WND and the application of a discrete Fourier transform DFT, the method adjusts the amplitude of the low frequencies according to a model that does not depend on the speaker concerned, and then applies an inverse Fourier transform. In the example of FIG. 5, the spectrum is divided into only two parts (low frequencies and high frequencies) and the (fixed) gain is therefore applied to only one portion of the spectrum (called the low frequency portion). In one possible implementation, the low frequencies are defined as audible frequencies below 100 Hz.

Figure 6:
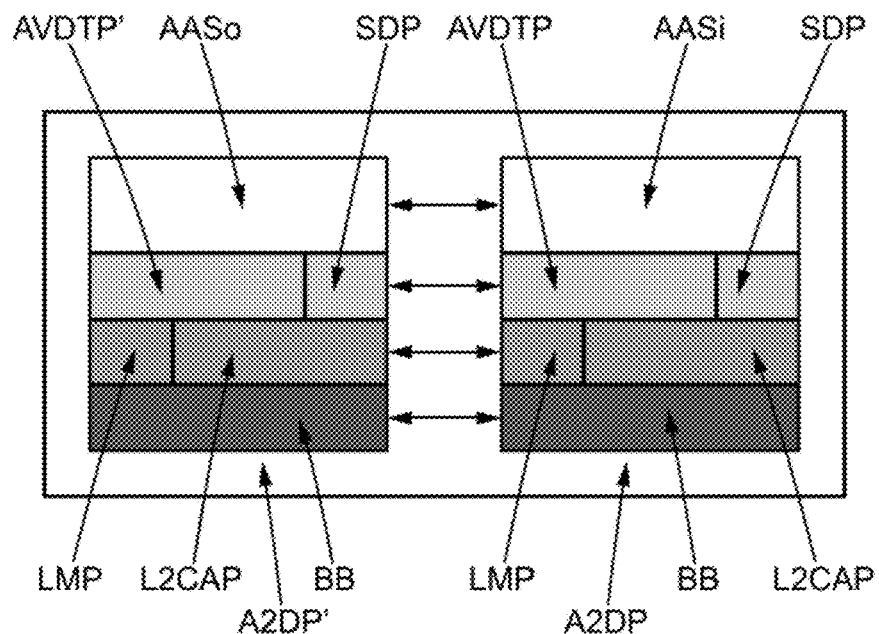
FIG. 6 illustrates a conventional A2DP profile, as well as an A2DP' profile according to an embodiment of the invention arranged to communicate with the conventional A2DP profile.

FIG. 6 illustrates a communication between a profile A2DP' according to an embodiment of the invention, said profile used by a master device called a "Source" (which corresponds to a device emitting an audio stream), and a conventional A2DP profile used by a Sink device. The Sink device corresponds for example to a Bluetooth speaker, it being understood that a Bluetooth speaker can comprise multiple Sink SEPs (multiple Sink SEPs can therefore correspond to the same Bluetooth speaker, each Sink SEP being able to correspond to a respective codec among all the codecs supported by that Bluetooth speaker).

In practice, the Bluetooth stacks of Bluetooth chip manufacturers only introduce one Source SEP per codec and per Bluetooth chip. It is therefore impossible to connect several audio devices (speakers for example) to a mobile phone, for a given codec.

The A2DP' profile differs from the A2DP profile in that an AVDTP' layer is used instead of the AVDTP layer. The AVDTP' layer provides all the functions of the AVDTP layer but in addition it allows a synchronized point-to-multipoint connection.

Figure 7:
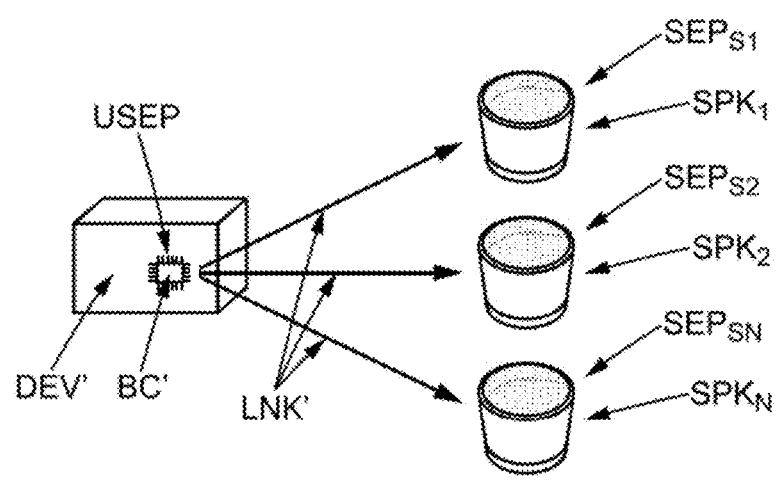
FIG. 7 illustrates a system comprising a device according to an embodiment of the invention as well as a set of Bluetooth speakers.

FIG. 7 illustrates a system comprising at least three Bluetooth speakers $SPK_1$, $SPK_2$ and $SPK_N$ each associated with a respective Sink SEP $SPE_{S1}$, $SEP_{S2}$, $SEP_{SN}$ (as mentioned above, each speaker $SPK_i$ could be associated with multiple Sink SEPs rather than a single Sink SEP $SEP_{Si}$, but for simplification only the Sink SEP actually used is represented). The system also comprises a device DEV' for controlling Bluetooth speakers according to one possible implementation of the invention. The device DEV' comprises a Bluetooth chip BC'. This Bluetooth chip BC' stores a unique SEP USEP identifying it. This Bluetooth chip BC' establishes a point-to-multipoint link LNK' with the three Bluetooth speakers $SPK_1$, $SPK_2$ and $SPK_N$, via respective SEPs $SEP_{S1}$, $SEP_{S2}$ and $SPE_{SN}$.

Figure 8:
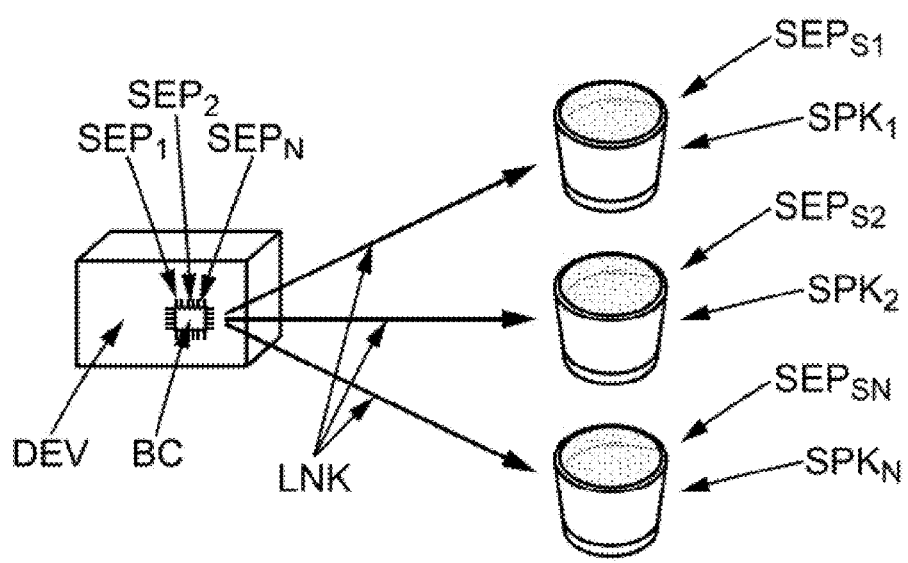
FIG. 8 illustrates a variant of the system of FIG. 7.

FIG. 8 illustrates a system comprising at least three Bluetooth speakers $SPK_1$, $SPK_2$ and $SPK_N$ each associated with a respective Sink SEP $SPE_{S1}$, $SEP_{S2}$, $SEP_{SN}$ (as mentioned above, each speaker $SPK_i$ could be associated with multiple Sink SEPs rather than a single Sink SEP $SEP_{Si}$, but for simplification only the Sink SEP actually used is represented). The system also comprises a device DEV for controlling Bluetooth speakers according to one possible implementation of the invention. The device DEV comprises a Bluetooth chip BC. This Bluetooth chip BC stores at least three SEPs $SEP_1$, $SEP_2$ and $SEP_N$ which simulate three different Bluetooth chips (but these are virtual Bluetooth chips because there is actually only one). The Bluetooth chip BC establishes a point-to-multipoint link LNK with the at least three Bluetooth speakers $SPK_1$, $SPK_2$ and $SPK_N$, but from the point of view of the Bluetooth standard, this link LNK appears to be a set of (at least) three point-to-point links. In effect, the SEP $SEP_1$ is connected to an SEP $SEP_{S1}$ of speaker $SPK_1$, the SEP $SEP_2$ is connected to an SEP $SEP_{S2}$ of speaker $SPK_2$, and the SEP $SEP_N$ is connected to an SEP $SEP_{SN}$ of speaker $SPK_N$.

A first embodiment relates to a device DEV for controlling wireless multimedia devices. The wireless multimedia devices are, for example, speakers $SPK_1$, $SPK_2$, $SPK_N$. However, a wireless multimedia device may also be, for example, a mobile phone comprising a speaker capable of acting as a loudspeaker and also comprising a screen suitable for streaming a video. A wireless multimedia device may also be a television comprising a wireless interface such as WiFi or Bluetooth, a computer comprising a wireless network card (WiFi, Bluetooth, etc.), or a WiFi or Bluetooth tablet. The control device DEV is, for example, a dedicated device, or an optional additional module to be attached to one of the multimedia devices (for example to one of the wireless speakers). The control device DEV may also be, for example, a computer, a mobile phone, or a tablet.

A wireless communication circuit BC of the device DEV is arranged to receive a wireless multimedia device identifier from each wireless multimedia device. The providing of identification compensates for the fact that the multimedia devices are unknown. The identifier is not necessarily intended for recognizing a specific instance of a wireless multimedia device. It is sufficient to allow recognizing the type of wireless multimedia device. If several wireless multimedia devices are of exactly the same model, they can therefore all be identified by the same identifier. A Bluetooth speaker (or more generally a Bluetooth device) automatically provides an identifier when it connects to a master device. It is therefore not necessary to modify the Bluetooth speaker (a state of the art Bluetooth speaker is suitable for the invention).

The device DEV comprises an access circuit DBC for accessing a database DB of wireless multimedia devices, arranged for obtaining from said database the characteristics of each wireless multimedia device for which the wireless communication circuit has received an identifier. These characteristics may include the various protocols supported by the wireless multimedia device, enabling the control device to choose the most appropriate protocol. A prerequisite for implementing the first embodiment therefore consists of listing the different types of existing wireless multimedia devices and their identifier, determining their relevant characteristics, and saving them in a database.

The circuit DEV comprises a separation circuit SEC for separating a main audio stream into as many separated multimedia streams as the wireless communication circuit has received identifiers of wireless multimedia devices. For example, the multimedia stream is or comprises a main audio stream, and the main audio stream comprises a plurality of distinct multiplexed streams (for example left stereo channel and right stereo channel), and the separation consists of extracting each of these two streams. In a very simple variant, the separation consists of duplicating as many copies as necessary of a single stream that has been received. According to a more complex variant, the device DEV is arranged to recreate, from a single stream or from several streams, a greater number of streams. For example, the separation circuit can recreate a multichannel environment (for example 5.1 surround sound) from a single channel (by signal processing).

The circuit DEV comprises an allocation circuit AC for allocating each separated multimedia stream to a respective wireless multimedia device. According to one possible implementation, the allocation circuit is called upon first, and it is only after the streams are allocated that these streams are extracted (separated) from the main stream. Alternatively, the circuit DEV begins by separating the streams by means of the separation circuit SEC, and then it allocates these separated streams.

The circuit DEV comprises a synchronization circuit SYC for synchronizing the separated multimedia streams based on characteristics of the wireless multimedia devices for which the wireless communication circuit has received an identifier. As explained in the description of FIG. 3, this synchronization may rely on signals which are added and analyzed with the aid of a microphone, but this represents increased complexity and additional cost. Other techniques are also conceivable.

According to a second embodiment, the characteristics of each wireless multimedia device $SPK_1$, $SPK_2$, $SPK_N$ of a device for controlling wireless multimedia devices according to the first embodiment include a latency of said multimedia device. The synchronization circuit SYC is arranged to temporally shift the transmission of a separated multimedia stream intended for a wireless multimedia device, based on its latency. This second embodiment eliminates one of the two main causes of desynchronization, namely the difference in internal latency. The proposed synchronization is a synchronization that can be described as static, as it is based on static characteristics such as the latency of the multimedia device. This latency is defined, for example, as the time that elapses between the moment when the wireless multimedia device receives a stream and the moment when that stream is actually reproduced by the wireless multimedia device. This time is fixed for wireless speakers. Different wireless multimedia devices have different latencies, and the static synchronization takes them into account in order to eliminate the time lags associated with these differences in latency.

Another possible cause of desynchronization is related to a loss of connection between the device for controlling wireless multimedia devices and at least one wireless multimedia device. This is a desynchronization that can be described as dynamic, as it depends on the particular context in which the multimedia stream concerned is reproduced (noise, interference, introduction of an object impeding wireless transmission, moving a portable multimedia device outside the field of the control device DEV, etc.). Under these circumstances, a wireless multimedia device which loses its connection with the control device is no longer synchronized with the other wireless multimedia devices when the connection with the control device is restored. In principle, this wireless multimedia device is receiving the lost packets even though the subsequent packets are being sent at the same time to the other wireless multimedia devices. To avoid this type of desynchronization, a first technique consists of never retransmitting lost multimedia stream packets. But in circumstances where the retransmission of such lost packets would have been possible, this unnecessarily degrades the playback quality of the multimedia stream. It is useful in some circumstances, however. For example, some wireless multimedia devices have limited protocol capabilities. For example, they may support a basic protocol that manages only the transmission of packets and does not check whether the sent packets have reached their destination and have arrived intact, and so do not attempt to retransmit lost packets (ignoring the existence of packet loss). They may also support a reliable protocol which does not allow any packet loss (when loss or corruption is detected, the packet is resent). But such a reliable protocol is likely to block communications if the wireless multimedia device is not reachable, because it endlessly attempts to resend the lost packets. If the database indicates that a wireless multimedia device supports only a basic protocol and a reliable protocol of the aforementioned types, in one possible implementation the control device chooses the basic protocol, accepting the risk of lost packets, in order to preserve the synchronization (a desynchronized packet is often more of a nuisance than a missing packet).

According to a third embodiment, a device DEV for controlling wireless multimedia devices according to one of the first and second embodiments is arranged, when a multimedia stream packet intended for a wireless multimedia device is lost, to resend said multimedia stream packet to said wireless multimedia device. Each wireless multimedia device comprises a buffer memory. The synchronization circuit SYC is arranged to determine a fill level of the buffer memory $BUF_1$, $BUF_2$ and $BUF_N$ of at least one wireless multimedia device $SPK_1$, $SPK_2$, $SPK_N$, and to determine a maximum duration, during which the device for controlling wireless multimedia devices can resend a lost multimedia stream packet to a wireless multimedia device, based on the fill level of the buffer memory of the at least one wireless multimedia device.

This is dynamic synchronization, which solves the aforementioned problem of loss of connection. The control device first tries to retransmit any lost packets. If it does not succeed, instead of blocking the system, the control device DEV, after a certain threshold duration (dynamically determined), stops attempting to retransmit the multimedia data which are not going through. On the other hand, there is a potential loss of data (portions of the multimedia stream may be permanently lost).

In order to determine a fill level of the buffer memory $BUF_1$, $BUF_2$ and $BUF_N$ of each wireless multimedia device $SPK_1$, $SPK_2$, $SPK_N$, the control device DEV estimates for example the remaining read time for this memory. When, at time t0, the control device DEV sends a multimedia stream of duration T corresponding to n bytes to a first wireless multimedia device, it waits for confirmation of receipt of these n bytes by this first wireless multimedia device. The control device then considers, at time t within [t0, t0+1], that a multimedia stream duration equal to t0+T−t remains in the buffer memory of the first wireless multimedia device. Thus, at time t, the control device can, for a duration t0+T−t, attempt to resend packets lost by a second wireless multimedia device with no risk of blocking the streaming of the first wireless multimedia device. After a duration t0+T−t, it is imperative for the first wireless multimedia device to have received the next sequence of the multimedia stream that it is streaming. If it has not, the first wireless multimedia device would stop streaming due to lack of data. The control device therefore ceases its attempt to retransmit lost packets when it determines by the aforementioned method that such a retransmission would block the streaming of another wireless multimedia device. Where appropriate, if bandwidth again becomes available while the second wireless multimedia device has not finished playing the contents of its buffer memory (based on an estimate of the aforementioned type), a new attempt to transmit the lost packet can occur.

With these arrangements, when a sufficiently short loss of connection occurs, the streaming of the multimedia stream on all the wireless multimedia devices remains synchronized. In the event of too long a loss of connection, the streaming is interrupted on the wireless multimedia devices affected by the loss of connection, but the streaming continues normally on the other wireless multimedia devices.

According to one possible implementation, the control device gives preference to transmitting the most recent packets. When multimedia devices that have lost their connection to the control device reestablish their connection, they receive packets synchronized with the other multimedia devices, not the packets that were previously lost.

According to a fourth embodiment, a device for controlling wireless multimedia devices according to one of the first to third embodiments comprises a harmonization circuit HAC for harmonizing the separated multimedia streams based on characteristics of the wireless multimedia devices for which the wireless communication circuit has received an identifier. The characteristics of each wireless multimedia device include a frequency response of said wireless multimedia device for each frequency band in a set of frequency bands, the harmonization circuit being arranged to adjust the amplitude of each frequency component of a separated multimedia stream intended for a wireless multimedia device, based on the frequency response of said wireless multimedia device for said frequency component. For example, if the frequency response for the frequency range [1000 Hz, 2000 Hz] is −3 dB, the amplitude of the signal transmitted to the wireless multimedia device concerned, within the band [1000 Hz, 2000 Hz], can be amplified by 3 dB in order to compensate. A multimedia stream may include frequency components in the audible spectrum, which one may wish to harmonize as an equalizer does. However, a multimedia stream may also comprise frequency components in the visible spectrum for example, which one may wish to harmonize across different wireless multimedia devices. For example, it may be desirable for the same video to have the same luminance and chrominance when it is streamed on different wireless multimedia devices. Thus, when the control device DEV discovers that a wireless multimedia device consisting of a wireless speaker is not very efficient in a certain frequency band and that the speaker attenuates more than it should, it is possible to amplify the signal transmitted in this frequency band.

According to a fifth embodiment, a method for controlling wireless multimedia devices comprises the receiving REC, by a wireless communication circuit, of a wireless multimedia device identifier $ID_1$, $ID_2$, $ID_N$ from each wireless multimedia device $SPK_1$, $SPK_2$, $SPK_N$. According to one possible implementation, the wireless communication circuit is a Bluetooth chip. According to one implementation, the wireless communication circuit is an assembly composed of a processor associated with a memory storing an appropriate computer program. According to another implementation, the communication circuit is a dedicated electronic chip, which is for example an FPGA or any other suitable circuit, including a custom-designed ad hoc circuit. According to a variant, the method is partially implemented by a dedicated electronic chip such as the aforementioned dedicated chips, and partially by a processor executing a suitable computer program.

The method comprises the obtaining OBT, by an access circuit for accessing a database DB of wireless multimedia devices, of characteristics $LAT_1$, $LAT_2$, $LAT_N$ of each wireless multimedia device for which an identifier $ID_1$, $ID_2$, $ID_N$ has been received by the wireless communication circuit BC. According to one implementation, the access circuit is an assembly composed of a processor associated with a memory storing an appropriate computer program. According to another implementation, the access circuit is a dedicated electronic chip, which is for example an FPGA or any other suitable circuit, including a custom-designed ad hoc circuit. According to a variant, the invention is partially implemented by a dedicated electronic chip such as the aforementioned dedicated chips, and partially by a processor executing a suitable computer program.

The method comprises the separation SPR, by a stream separation circuit, of a main multimedia stream into as many separated multimedia streams as the wireless communication circuit has received wireless multimedia device identifiers. According to one implementation, the separation circuit SPR is an assembly composed of a processor associated with a memory storing an appropriate computer program. According to another implementation, the separation circuit is a dedicated electronic chip, which is for example an FPGA or any other suitable circuit, including a custom-designed ad hoc circuit. According to a variant, the invention is partially implemented by a dedicated electronic chip such as the aforementioned dedicated chips, and partially by a processor executing a suitable computer program.

The method comprises the allocation ATT, by an allocation circuit, of each separated multimedia stream to a respective wireless multimedia device. According to one implementation, the allocation circuit ATT is an assembly composed of a processor associated with a memory storing an appropriate computer program. According to another implementation, the allocation circuit is a dedicated electronic chip, which is for example an FPGA or any other suitable circuit, including a custom-designed ad hoc circuit. According to a variant, the invention is partially implemented by a dedicated electronic chip such as the aforementioned dedicated chips, and partially by a processor executing a suitable computer program.

The method comprises the synchronization SYN, by a synchronization circuit, of the separated multimedia streams based on characteristics of the wireless multimedia devices for which the wireless communication circuit has received an identifier. According to one implementation, the synchronization circuit is an assembly composed of a processor associated with a memory storing an appropriate computer program. According to another implementation, the synchronization circuit is a dedicated electronic chip, which is for example an FPGA or any other suitable circuit, including a custom-designed ad hoc circuit. According to a variant, the invention is partially implemented by a dedicated electronic chip such as the aforementioned dedicated chips, and partially by a processor executing a suitable computer program.

According to one possible implementation, the wireless communication circuit, the access circuit, the separation circuit, the allocation circuit, and the synchronization circuit share the same processor or even the same memory chip (in the latter case, the memory chip can store computer programs specific to each of these circuits, at different addresses).

According to a sixth embodiment, the characteristics of each wireless multimedia device of a method for controlling wireless speakers according to the fifth embodiment include a latency $LAT_1$, $LAT_2$, $LAT_N$ of said wireless multimedia device $SPK_1$, $SPK_2$, $SPK_N$. The synchronization circuit temporally shifts the transmission of a separated multimedia stream intended for a wireless multimedia device, based on its latency.

According to a seventh embodiment, a method for controlling wireless speakers according to one of the fifth and sixth embodiments is arranged so that when a multimedia stream packet (for example an audio stream packet) intended for a wireless multimedia device is lost, the method resends (step RSND) said multimedia stream packet to said wireless multimedia device. As each wireless multimedia device comprises a buffer memory, the synchronization circuit determines DET a fill level of the buffer memory of at least one wireless multimedia device, and determines a maximum duration during which the device for controlling wireless multimedia devices can resend a lost multimedia stream packet to a wireless multimedia device based on the fill level of the buffer memory of the at least one wireless multimedia device.

According to an eighth embodiment, a method for controlling wireless multimedia devices according to one of the fifth to seventh embodiments harmonizes, with a harmonization circuit HRM, the separated multimedia streams based on characteristics of the wireless multimedia devices for which the wireless communication circuit has received an identifier. The characteristics of each wireless multimedia device include a frequency response of said wireless multimedia device for each frequency band in a set of frequency bands. The harmonization circuit adjusts the amplitude of each frequency component of a separated multimedia stream intended for a wireless multimedia device, based on the frequency response of said wireless multimedia device for said frequency component.

According to one implementation, the harmonization circuit is an assembly composed of a processor associated with a memory storing an appropriate computer program. According to another implementation, the harmonization circuit is a dedicated electronic chip, which is for example an FPGA or any other suitable circuit, including a custom-designed ad hoc circuit. According to a variant, the invention is partially implemented by a dedicated electronic chip such as the aforementioned dedicated chips, and partially by a processor executing a suitable computer program.

According to one possible implementation, the wireless communication circuit, the access circuit, the separation circuit, the allocation circuit, the synchronization circuit, and the harmonization circuit share the same processor or even the same memory chip (in the latter case, the memory chip can store computer programs specific to each of these circuits, at different addresses).

According to a ninth embodiment, a computer program comprises a series of instructions which, when executed by a processor, implement a method according to one of the fifth to eighth embodiments. This computer program is written, for example, in a low-level language such as an assembly language, or in a higher level and more portable language such as the C language. According to one possible implementation, the computer program is divided into a plurality of modules. According to one possible implementation, the various modules are all written in the same language, for example the C language or an assembly language. Alternatively, some modules are written in different languages, for example some modules are written in C, others in an assembly language. According to one possible implementation, all the modules are stored in the same memory. Alternatively, some modules are stored in separate memories.

According to a tenth embodiment, a computer-readable non-transitory storage medium stores a computer program according to the ninth embodiment.

According to one possible implementation, the storage medium is a USB key, an SD card, or a micro SD card. In a variant, the storage medium is any memory card. In another variant, the storage medium is a memory chip which is intended to be mounted on an electronic circuit. These include, for example, an EEPROM, ROM, or Flash memory. According to one possible variant, the storage medium is a magnetic medium (for example hard drive) or optical medium (for example CD or DVD).

An eleventh embodiment relates to a device (for example DEV or DEV') for controlling Bluetooth multimedia devices, this control device comprising a Bluetooth chip (for example BC or BC').

Bluetooth multimedia devices are, for example, Bluetooth speakers. "Bluetooth speaker" indicates any Bluetooth device containing at least one loudspeaker arranged to broadcast a sound that can be simultaneously heard by multiple people. It may, for example, be an acoustic speaker for a hi-fi system, or a mobile phone equipped with a loudspeaker intended to be audible to multiple people, provided that it is this loudspeaker that is controlled by the control device. More precisely, "sound that can be simultaneously heard by multiple people" is understood to mean a sound that is perceptible (in the sense that its content can be distinguished) by any person with normal hearing positioned at a distance of at least one meter from the speaker, in the presence of ambient noise corresponding to that of a conversation, meaning approximately 40 dB SPL. A headset, an ear bud, or a telephone receiver are therefore not speakers within the meaning of the present application, since they must be positioned in or against the ear in order to hear the emitted sounds.

According to one possible implementation, the Bluetooth multimedia devices are Bluetooth headsets. Such headsets are for example connected with a television and need to be synchronized with each other in addition to being synchronized with a video stream playing on the television.

More generally, each of the Bluetooth multimedia devices can be a Bluetooth television, a Bluetooth screen, a Bluetooth mobile phone, a Bluetooth laptop or desktop, a Bluetooth tablet, a Bluetooth hi-fi system, a Bluetooth car stereo, or a Bluetooth digital media player.

The control device DEV or DEV' is, for example, a Bluetooth television, a Bluetooth screen, a Bluetooth mobile phone, a Bluetooth laptop or desktop, a Bluetooth tablet, a Bluetooth hi-fi system, a Bluetooth car stereo, or a Bluetooth digital media player.

The Bluetooth chip (for example BC or BC' in the figures) is arranged to implement a modified A2DP profile (denoted A2DP' in FIG. 1) so as to create a point-to-multipoint link (for example LNK or LNK') from said Bluetooth chip to a plurality of Bluetooth multimedia devices $SPK_1$, $SPK_2$, $SPK_N$. The Bluetooth chip of the control device is arranged to transmit a plurality of multimedia streams related to each other, each intended for a respective Bluetooth multimedia device among said plurality of Bluetooth multimedia devices, while relying on a non-blocking usage of Bluetooth. It is understood that multimedia streams "related to each other" means that the multimedia streams relate to the same situation (for example the same scene or the same music) but may nevertheless be different. For example, the multimedia streams can be six audio streams each corresponding to one of the 5.1 channels of an audio recording, or can be several videos of the same scene, filmed at the same time but from different viewpoints. The control device is for example arranged to transmit an audio stream (or more generally a multimedia stream) via a Bluetooth wireless link. For example, it stores or relays a multimedia stream comprising at least an audio channel. For example, it stores MP3 files, or connects to a server (such as a Youtube® server) from which it downloads a stream that it progressively and simultaneously retransmits via Bluetooth to multiple Bluetooth multimedia devices.

By relying on a non-blocking usage of Bluetooth instead of the blocking usage that is the default in A2DP, the control device avoids loss of synchronization. "Non-blocking usage of Bluetooth" is understood to mean any configuration of Bluetooth (via a Bluetooth mode and/or via other Bluetooth parameters) that does not block the Bluetooth chip of the device for controlling Bluetooth multimedia devices. A non-blocking usage of Bluetooth is therefore a use of Bluetooth which avoids forcing the Bluetooth chip to retransmit an unreceived packet as long as it has not been received, and which also avoids forcing it to retransmit such a packet beyond the moment when at least one Bluetooth multimedia device no longer has data in its buffer memory due, for example, to unsuccessful packet retransmission attempts monopolizing the Bluetooth communications. A non-blocking usage corresponds to a set of parameters (FTO, QoS, Mode, Extended Flow features) and not only to a mode (such as SM mode) in the sense of the Bluetooth standard. This involves for example the "Flow Control" mode or any mode in which the "Flush Timeout" parameter is set according to the Bluetooth standard to prevent any retransmission. Conversely, a blocking usage is a usage which leads, for example, to retransmitting data as long as it has not been received, or which leads to retransmitting data when a higher priority Bluetooth multimedia device is also awaiting data and has not received them because of said use (it is therefore blocked). Blocking usage is used in the prior art because it avoids occasional data losses (in the event of a prolonged cutoff for a period exceeding a given threshold, blocking usage does not prevent loss of data). In the assumption that Bluetooth is adapted to allow point-to-multipoint streaming, employing a non-blocking usage eliminates the risk of a Bluetooth multimedia device becoming inaccessible and preventing any transmission of data to all the Bluetooth multimedia devices. A Bluetooth multimedia device may become inaccessible for example because it has been moved out of range of the Bluetooth chip of the control device DEV, or because it contains a battery that has been exhausted, or for any other reason.

The default Bluetooth L2CAP settings mentioned in the introduction are not suitable for setting up an A2DP synchronized link of a Bluetooth master device to multiple Bluetooth slave devices. Indeed, if one of the links established between the master and a slave (for example a speaker) is configured with an infinite "Flush Timeout", and if the speaker leaves the Bluetooth field or is powered by a battery which is then exhausted, then the data will be continually sent to the speaker which never receives it and will therefore block any other transmission of data to the other slave devices (as the data are sent sequentially). On the other hand, if the "Flush Timeout" parameter is defined by default, the resending of data to a speaker could cause a time lag between this speaker and the others. When a speaker that has left the Bluetooth field of the master Bluetooth device returns to said field, it would then continue broadcasting the stream from the point where it had stopped due to leaving said field.

According to one possible implementation, the device for controlling Bluetooth multimedia devices is arranged to determine automatically, from the different configurations supported by the Bluetooth stacks of the Bluetooth multimedia devices, the configuration to be adopted for each L2CAP channel (corresponding to a logical link between the Bluetooth chip of the device for controlling Bluetooth speakers and a Bluetooth multimedia device) so as to maintain a synchronized link between the device for controlling Bluetooth multimedia devices and the various slave multimedia devices. The L2CAP parameters of each of the multimedia devices may be different (they may depend on the characteristics of these multimedia devices, their ability to support certain protocols, etc.).

According to one possible implementation, the device for controlling Bluetooth multimedia devices is arranged to set all the Flush Timeouts for the various L2CAP channels to the value defined by the Bluetooth standard (namely 1, but this could vary depending on the implementations) so that no retransmission is performed. The connection thus obtained is unreliable in the sense that transmission errors or losses are not remedied, but ensures synchronization after any packet loss.

According to one possible implementation, the modification of the A2DP profile consists of modifying the AVDTP layer used by the A2DP profile, for example in one of the ways indicated below. In order to implement an AVDTP layer corresponding to a modified AVDTP layer, it is possible in particular to use an available implementation such as BlueZ (well known to those skilled in the art), designed to implement Bluetooth technology on Linux operating systems and available under the GNU GPL license. The BlueZ implementation has become a reference Bluetooth implementation for Linux and has been integrated into the Linux kernel.

According to a twelfth embodiment, the Bluetooth chip of a device for controlling Bluetooth multimedia devices according to the eleventh embodiment is arranged, when a multimedia stream packet that it has transmitted to a Bluetooth multimedia device is lost, to resend said multimedia stream packet to said Bluetooth multimedia device. The Bluetooth chip is arranged to determine a fill level of a buffer memory of at least one Bluetooth multimedia device $SPK_1$, $SPK_2$, $SPK_N$, and to determine a maximum duration during which it can resend the lost multimedia stream packet to the Bluetooth multimedia device based on the fill level of the buffer memory of the at least one Bluetooth multimedia device.

According to one possible implementation, this maximum duration corresponds to the buffer memory that is the least full among the buffer memories of all the other Bluetooth multimedia devices, from which it is necessary to deduce the time required to transmit a sufficient multimedia stream portion. The content of the buffer memory of the Bluetooth multimedia device which has lost a packet is then not taken into account.

According to another implementation, this maximum duration corresponds to the buffer memory that is the least full among the buffer memories of all the Bluetooth multimedia devices (including the one that has lost the packet), from which it is necessary to deduce the time required to transmit a sufficient multimedia stream portion. If there is a risk that the Bluetooth multimedia device that has lost the packet will run out of multimedia stream data to be played, it may be considered more appropriate to abandon the attempt to retransmit the lost packet which in any case would be delayed in its playback and would therefore not be synchronized with the other Bluetooth multimedia devices.

According to another implementation, the Bluetooth chip is arranged to identify the Bluetooth multimedia devices for which it is not necessary to check the fill level of the buffer memory. For example, the Bluetooth chip may exclude a number n of the last Bluetooth multimedia devices to which it has supplied data to the buffer memories, if it can be deduced therefrom that other Bluetooth multimedia devices must necessarily exist whose buffer memories are less full and which will determine said maximum duration.

According to another implementation, the Bluetooth chip is arranged to store an identifier of the Bluetooth multimedia device whose buffer memory has not been fed data for the longest time. When a packet is lost, the Bluetooth chip only checks the buffer memory of that Bluetooth multimedia device whose buffer memory has not been fed data for the longest time.

According to one possible implementation, the control device is designed to transmit audio stream portions of approximately 14 ms (corresponding to the duration of an audio stream block encoded by the SBC codec). According to one possible implementation, the control device controls four Bluetooth multimedia devices, and the transmission of a portion of about 14 ms takes about 1.3 ms. It takes about 4*1.3 ms which is about 5.2 ms to transmit about 14 ms of stream to the four Bluetooth multimedia devices, which leaves about 14 ms-5.2 ms or about 8.8 ms during which the control device can identify corrupted packets or packets not transmitted and retransmit them.

According to one possible implementation, the device for controlling Bluetooth multimedia devices is arranged to configure the "Flush Timeout" of each L2CAP channel according to the fill state of the buffer memories of the Bluetooth multimedia devices, which it must estimate beforehand, for example by one of the aforementioned methods.

According to one possible implementation, the Bluetooth chip of a device for controlling Bluetooth multimedia devices according to the eleventh embodiment is arranged to generate a single SEP for controlling all the Bluetooth multimedia devices. More precisely, the A2DP profile of the Source SEP (the Bluetooth chip) is modified, for example by substituting a modified AVDTP' layer for a conventional AVDTP layer. The change consists of removing restrictions that prevent a Source SEP from connecting to more than one Sink SEP. However, the Bluetooth standard does not require checking a Sink SEP to verify that the Source SEP with which it communicates does not also communicate with another Sink SEP. It turns out that it is technically possible, from the same Source SEP, to broadcast multimedia streams (in particular audio) to multiple Sink SEPs from a single Bluetooth chip.

As the Bluetooth standard does not allow communication from one Source SEP to multiple Sink SEPs, the present implementation constitutes a sort of extension to the Bluetooth standard, an extension which does not create any difficulties since the Bluetooth standard is not designed to detect such an extension.

It is of course possible to provide, in the device for controlling Bluetooth multimedia devices, a plurality of Bluetooth chips each arranged to generate a single SEP for controlling the Bluetooth multimedia devices respectively managed by each one. For example, a Bluetooth chip no. 1 could manage multimedia devices numbered 1 to 5, a Bluetooth chip no. 2 could manage multimedia devices numbered 6 to 10, and a Bluetooth chip no. 3 could manage multimedia devices numbered 11 to 15. The maximum throughput of a Bluetooth chip limits the number of multimedia devices it can control, and if the number of multimedia devices exceeds a given threshold, the addition of a Bluetooth chip would allow controlling additional multimedia devices simultaneously.

According to a thirteenth embodiment, the Bluetooth chip of a device for controlling Bluetooth multimedia devices according to the eleventh or twelfth embodiment is arranged to generate a plurality of SEPs for controlling the Bluetooth multimedia devices.

According to one advantageous implementation, the Bluetooth chip generates a separate Source SEP for each Sink SEP (corresponding to each Bluetooth multimedia device that it is to control). This is an alternative of the aforementioned implementation, where the Bluetooth chip is more in accordance with the Bluetooth standard. Indeed, the appearance is more that of point-to-point links and not a point-to-multipoint link. This is of course a trick which consists of generating a plurality of virtual SEPs in the same Bluetooth chip to simulate a plurality of Source devices where there is actually only one Bluetooth chip.

It is of course possible to provide a plurality of Bluetooth chips in the device for controlling Bluetooth multimedia devices, each arranged to generate as many Source SEPs as there are Bluetooth multimedia devices respectively managed by each one. For example, a Bluetooth chip no. 1 could manage Bluetooth multimedia devices numbered 1-5 using respective Source SEPs $SEP_1$ to $SEP_6$, a Bluetooth chip no. 2 could manage Bluetooth multimedia devices numbered 6 through 10 using respective Source SEPs $SEP_6$ to $SEP_{10}$, and a Bluetooth chip no. 3 could manage Bluetooth multimedia devices numbered 11 to 15 using respective Source SEPs $SEP_{11}$ to $SEP_{15}$. The maximum throughput of a Bluetooth chip limits the number of multimedia devices it can control, and if the number of multimedia devices exceeds a given threshold, the addition of a Bluetooth chip would allow controlling additional multimedia devices simultaneously. The number of Source SEPs generated by a Bluetooth chip does not affect the bandwidth available in this Bluetooth chip, which remains the same but is shared between these different Source SEPs. According to one possible implementation, the Bluetooth chip creates a maximum of seven Source SEPs in order to use a piconet to manage the Bluetooth multimedia devices that it controls. A piconet is a network comprising from 1 to 8 Bluetooth devices: a single master Bluetooth device (i.e. Source) and up to 7 slave Bluetooth devices (i.e. Sink), as is specified by the Bluetooth standard. The limitation to seven Sink devices per Source device arises from Bluetooth addressing, which identifies each slave Bluetooth device using three bits, 000 being reserved for a specific mode called "Connectionless Broadcast".

According to a fourteenth embodiment, the Bluetooth chip of a device for controlling Bluetooth multimedia devices according to one of the eleventh to thirteenth embodiments is arranged to control up to five Bluetooth multimedia devices, using an SBC codec. "Control up to five Bluetooth multimedia devices" is understood to mean that regardless of the audio stream SBC that is transmitted, it is possible to stream this stream on five speakers. If there are less than five speakers, this becomes all the more possible.

A stereo audio stream of good quality, so-called CD quality, has a sampling rate of 44.1 kHz and uses 16-bit samples for the audio signal. Each second, 44,100 16-bit samples are therefore provided for the left channel and 44,100 other 16-bit samples are provided for the right channel. The raw bit rate of such a stream is thus 44,100*2*16 bit/s, which is a little more than 1.4 Mbit/s. Such a bit rate is very high, and it is therefore useful to compress it in order to reduce the bandwidth required during transmission, in particular a Bluetooth transmission where the throughput is not very high. Codecs are used to achieve this compression. The SBC codec is a very simple and very effective codec. "Effective" is understood to mean that the SBC codec requires very little memory and CPU resources to function. This is very useful for Bluetooth chips, which often have limited memory and computing power. The SBC codec is free. It is also advantageous because it is very widespread, and thus ensures great interoperability. However, it is rather inefficient in terms of compression rate and audio quality. The bit rate of an audio stream encoded by an SBC codec is at most 372 kbit/s (in some cases, SBC generates a lower bit rate, in particular in order to adapt to the available bandwidth, and thus allows controlling more than five Bluetooth multimedia devices if required). More powerful codecs exist, however. For example, an AAC codec generates a compressed audio stream of approximately 192 kbit/s of a quality substantially equivalent to that of a 372 kbit/s SBC stream. Apt-X codecs also provide improved performance (lower bit rate at equivalent quality), but are not free.

Similarly to conventional Bluetooth speakers, the Bluetooth bandwidth for EDR compatible devices ("Enhanced Data Rate") is 2.1 Mbit/s. It is thus possible to accommodate at least five streams encoded by an SBC codec (at a maximum of 372 kbit/s) in the available bandwidth.

According to one possible implementation, the Bluetooth chip uses an AAC codec, which theoretically allows transmitting ten (nearly eleven) encoded AAC streams at 192 kbit/s. It is nevertheless advantageous, according to one possible implementation, to limit the number of AAC streams to seven in order to be able to set up a piconet according to the Bluetooth standard (which limits the number of slave devices to 7). In other alternatives, other codecs are used, and it is possible to transmit up to seven encoded streams, or less if the bit rate of the encoded stream is greater than 300 kbit/s (in this case the number of possible encoded streams is equal to the ratio of 2,100,000 and the bit rate of an encoded stream expressed in bit/s).

A fifteenth embodiment relates to a method for controlling Bluetooth multimedia devices by a Bluetooth chip. The Bluetooth chip implements a modified A2DP profile (denoted A2DP') so as to create a point-to-multipoint link from said Bluetooth chip to a plurality of Bluetooth multimedia devices, the Bluetooth chip transmitting a plurality of multimedia streams related to each other, each intended for a respective Bluetooth multimedia device among said plurality of Bluetooth multimedia devices, while relying on a non-blocking usage of Bluetooth.

According to one possible implementation, the Bluetooth chip comprises a processor and executes a computer program adapted to implement an A2DP' profile so as to create a point-to-multipoint link from said Bluetooth chip to a plurality of Bluetooth multimedia devices, the Bluetooth chip transmitting a plurality of multimedia streams related to each other, each intended for a respective Bluetooth multimedia device among said plurality of Bluetooth multimedia devices, while relying on a non-blocking usage of Bluetooth.

According to an alternative implementation, it is a device for controlling Bluetooth multimedia devices comprising said Bluetooth chip which also comprises a processor and executes a computer program adapted to implement an A2DP' profile so as to create a point-to-multipoint link from said Bluetooth chip to a plurality of Bluetooth multimedia devices, the Bluetooth chip transmitting a plurality of multimedia streams related to each other, each intended for a respective Bluetooth multimedia device among said plurality of Bluetooth multimedia devices, while relying on a non-blocking usage of Bluetooth.

In the two aforementioned implementations, the computer program is stored in a memory (for example EEPROM, Flash, or ROM). This memory may be embedded in the Bluetooth chip or in the device for controlling Bluetooth multimedia devices but outside the Bluetooth chip. According to a variant, the computer program is stored partly in the Bluetooth chip and partly in the device for controlling Bluetooth multimedia devices. According to a variant, the device for controlling Bluetooth multimedia devices and the Bluetooth chip each comprise at least one separate processor, and each executes a portion of the computer program which is stored either in a single location (single memory chip) or in a distributed manner in multiple memory chips (for example a memory chip of the Bluetooth chip and a memory chip of the device for controlling Bluetooth multimedia devices).

According to another implementation, the method is implemented not by a computer program but by a dedicated electronic chip, which is for example an FPGA or any other suitable circuit, including an ad hoc circuit. According to a variant, the method is partially implemented by a dedicated electronic chip such as a dedicated chip as mentioned above, and partially by a processor executing a suitable computer program.

According to a sixteenth embodiment, the Bluetooth chip of a method for controlling Bluetooth multimedia devices according to the fifteenth embodiment, when a multimedia stream packet that the Bluetooth chip has transmitted to a Bluetooth multimedia device is lost, resends said multimedia stream packet to said Bluetooth multimedia device, and determines a fill level of a buffer memory of each Bluetooth multimedia device $SPK_1$, $SPK_2$, $SPK_N$ in order to deduce therefrom a maximum duration during which it can resend the lost multimedia stream packet to the Bluetooth multimedia device based on the fill level of the buffer memory of the Bluetooth multimedia devices.

According to a seventeenth embodiment, the Bluetooth chip of a method for controlling Bluetooth multimedia devices according to the fifteenth or sixteenth embodiment generates several SEPs $SEP_1$, $SEP_2$, ... $SEP_N$ for controlling the Bluetooth multimedia devices $SPK_1$, $SPK_2$, ... $SPK_N$.

According to an eighteenth embodiment, the Bluetooth chip of a method for controlling Bluetooth multimedia devices according to one of the fifteenth to seventeenth embodiments controls five Bluetooth multimedia devices by using an SBC codec.

A nineteenth embodiment relates to a computer program comprising a series of instructions which, when executed by a processor, implement a method according to one of the fifteenth to eighteenth embodiments. This computer program is written, for example, in a low-level language such as an assembly language, or in a higher level and more portable language such as the C language. According to one possible implementation, the computer program is divided into a plurality of modules. According to one possible implementation, the various modules are all written in the same language, for example the C language or an assembly language. Alternatively, some modules are written in different languages, for example some modules are written in C, others in an assembly language. According to one possible implementation, all the modules are stored in the same memory. Alternatively, some modules are stored in separate memories.

A twentieth embodiment relates to a computer-readable non-transitory storage medium storing a computer program according to the nineteenth embodiment. According to one possible implementation, the storage medium is a USB key, an SD card, or a micro SD card. In a variant, the storage medium is any memory card. In another variant, the storage medium is a memory chip which is intended to be mounted on an electronic circuit. These include, for example, EEPROM, ROM, or Flash memory. According to one possible variant, the storage medium is a magnetic medium (for example hard drive) or optical medium (for example CD or DVD).

The invention is not limited to the embodiments described above by way of example. The usable memories cover any type of memory.

The embodiments described in relation to the device for controlling wireless multimedia devices can be transposed to the methods for controlling wireless multimedia devices, as well as to the computer programs and to the program storage media according to embodiments of the invention, and vice versa. In addition, the first to tenth embodiments may be combined with the eleventh to the twentieth embodiments. For example, it is possible in the eleventh to twentieth embodiments to query a database as provided for in the first embodiment, in order to recognize the characteristics of the Bluetooth multimedia devices, for example their latencies. Conversely, it is possible to provide, for example, that the first to tenth embodiments implement a Bluetooth wireless protocol modified in any manner as set forth in the eleventh to twentieth embodiments.

The invention claimed is:

1. A device for controlling wireless multimedia devices, comprising:
  a wireless communication circuit, arranged to receive a wireless multimedia device identifier from each wireless multimedia device;
  an access circuit for accessing a database of wireless multimedia devices, arranged to obtain from said database characteristics of each wireless multimedia device for which the wireless communication circuit has received an identifier,
  said database being external to each of the wireless multimedia devices for which the wireless communication circuit has received an identifier;
  a separation circuit for separating a main multimedia stream into as many separated multimedia streams as the wireless communication circuit has received identifiers of wireless multimedia devices;
  an allocation circuit for allocating each separated multimedia stream to a respective wireless multimedia device; and
  a synchronization circuit for synchronizing the separated multimedia streams based on the characteristics of the wireless multimedia devices obtained from the database.

2. The device for controlling wireless multimedia devices according to claim 1, wherein the characteristics of each wireless multimedia device include a latency of said multimedia device, the synchronization circuit being arranged to temporally shift the transmission of a separated multimedia stream intended for a wireless multimedia device, based on its latency.

3. The device for controlling wireless multimedia devices according to claim 1, arranged, when a multimedia stream packet intended for a wireless multimedia device is lost, to resend said multimedia stream packet to said wireless multimedia device, wherein, as each wireless multimedia device comprises a buffer memory, the synchronization circuit is arranged to determine a fill level of the buffer memory of at least one wireless multimedia device, and to determine a maximum duration during which the device for controlling wireless multimedia devices can resend a lost multimedia stream packet to a wireless multimedia device based on the fill level of the buffer memory of the at least one wireless multimedia device.

4. The device for controlling wireless multimedia devices according to claim 1, comprising a harmonization circuit for harmonizing the separated multimedia streams based on characteristics of the wireless multimedia devices for which the wireless communication circuit has received an identifier, the characteristics of each wireless multimedia device including a frequency response of said wireless multimedia device for each frequency band in a set of frequency bands, the harmonization circuit being arranged to adjust the amplitude of each frequency component of a separated multimedia stream intended for a wireless multimedia device, based on the frequency response of said wireless multimedia device for said frequency component.

5. A method for controlling wireless multimedia devices, comprising:
  receiving, by a wireless communication circuit, a wireless multimedia device identifier from each wireless multimedia device;
  obtaining, by an access circuit for accessing a database of wireless multimedia devices, characteristics of each wireless multimedia device for which an identifier has been received by the wireless communication circuit,
  said database being external to each of the wireless multimedia devices for which the wireless communication circuit has received an identifier;
  separating, by a stream separation circuit, a main multimedia stream into as many separated multimedia streams as the wireless communication circuit has received wireless multimedia device identifiers;
  allocating, by an allocation circuit, each separated multimedia stream to a respective wireless multimedia device; and
  synchronizing, by a synchronization circuit, the separated multimedia streams based on the characteristics of the wireless multimedia devices obtained from the database.

6. The method for controlling wireless multimedia devices according to claim 5, wherein the characteristics of each wireless multimedia device include a latency of said wireless multimedia device, and wherein the synchronization circuit temporally shifts the transmission of a separated multimedia stream intended for a wireless multimedia device, based on its latency.

7. The method for controlling wireless multimedia devices according to claim 5, wherein, when a multimedia stream packet intended for a wireless multimedia device is lost, the method resends said multimedia stream packet to said wireless multimedia device, and wherein, as each wireless multimedia device comprises a buffer memory, the synchronization circuit determines a fill level of the buffer memory of at least one wireless multimedia device, and determines a maximum duration during which the device for controlling wireless multimedia devices can resend a lost multimedia stream packet to a wireless multimedia device based on the fill level of the at least one wireless multimedia device.

8. The method for controlling wireless multimedia devices according to claim 5, wherein a harmonization circuit harmonizes the separated multimedia streams based on characteristics of the wireless multimedia devices for which the wireless communication circuit has received an identifier, the characteristics of each wireless multimedia device including a frequency response of said wireless multimedia device for each frequency band in a set of frequency bands, the harmonization circuit adjusting the amplitude of each frequency component of a separated multimedia stream intended for a wireless multimedia device, based on the frequency response of said wireless multimedia device for said frequency component.

9. A non-transitory computer readable storage medium, having stored thereon a computer program comprising program instructions, the computer program being loadable into a data-processing unit and adapted to cause the data-processing unit to carry out, for controlling wireless multimedia devices, a method comprising:
- receiving, by a wireless communication circuit, a wireless multimedia device identifier from each wireless multimedia device;
- obtaining, by an access circuit for accessing a database of wireless multimedia devices, characteristics of each wireless multimedia device for which an identifier has been received by the wireless communication circuit, said database being external to each of the wireless multimedia devices for which the wireless communication circuit has received an identifier;
- separating, by a stream separation circuit, a main multimedia stream into as many separated multimedia streams as the wireless communication circuit has received wireless multimedia device identifiers;
- allocating, by an allocation circuit, each separated multimedia stream to a respective wireless multimedia device; and
- synchronizing, by a synchronization circuit, the separated multimedia streams based on the characteristics of the wireless multimedia devices obtained from the database.

* * * * *